United States Patent
Preston

[15] 3,644,141
[45] Feb. 22, 1972

[54] METHOD OF DISPERSING REACTION OF ORGANOSILANE AND POLYOLEFIN

[72] Inventor: Jerome A. Preston, Fort Wayne, Ind.
[73] Assignee: Owens-Corning Fiberglas Corporation
[22] Filed: Dec. 5, 1968
[21] Appl. No.: 781,618

[52] U.S. Cl. ............... 117/126 GS, 117/126 GB, 117/100 S, 260/827, 260/29.4 M, 260/29.6 R, 264/112, 264/143
[51] Int. Cl. .......................................................C03c 25/02
[58] Field of Search..................260/827, 29.4 M, 29.6 R; 117/126 GR, 126 GS, 72, 27, 100 S; 264/112, 143

[56] References Cited

UNITED STATES PATENTS 2,504,136  4/1950  Lee.....................................117/126 X
3,159,600  12/1964  Watkins..............................117/126 X
3,505,279  4/1970  Preston et al. ......................260/827 X Primary Examiner—William D. Martin
Assistant Examiner—D. Cohen
Attorney—Staelin & Overman

[57] ABSTRACT

A method of dispersing polyolefins in water and a resulting product useful as a coating material for glass fibers. Glass fibers coated with the products and mixed with polyolefin molding resins produce molded parts having increased strength. The polyolefin material is combined with an organosilane and the combination is then mixed with a water dispersible polyester material which acts as a carrier for the polyolefin-silane material during a subsequent emulsification or dispersing operation.

9 Claims, No Drawings

METHOD OF DISPERSING REACTION OF ORGANOSILANE AND POLYOLEFIN

BACKGROUND OF THE INVENTION

The present invention relates to the use of polyolefin resins both as coatings and as molding compounds. A preferred reinforcement for molding compounds is glass fibers and a problem has existed in the prior art in producing a good bond between the polyolefin resin and the glass fibers.

The glass fibers which are used for reinforcing resins are produced by attenuating streams of molten glass into tiny monofilaments which are gathered together into a strand which is being advanced at about 10,000 feet per minute and wrapped around a revolving drum. The glass fibers are easily scratched when pulled over guide surfaces or when rubbed against each other as the fibers are gathered into a strand or when a strand is flexed during processing or use. In order to protect the fibers, it is necessary to apply a lubricous film to the attenuated filaments before they are brought together into a strand and are wrapped around the drum. In the usual commercial operation, an aqueous solution of a film former is used for this purpose and the resulting coiled packages are then dried to leave a protecting coating on the filaments. In some instances, organic solutions of film formers have been used. Organic solvents are expensive, however, and create an explosion hazard inasmuch as they are applied to the fibers at a location adjacent high temperature and high voltage equipment.

An object of the present invention is the provision of a new and improved method for dispersing a polyolefin in water.

A further object of the invention is the provision of a new and improved method of strongly attaching polyolefin-molding resins to glass fibers.

SUMMARY

According to the present invention, polyolefins are made dispersible in water by first combining them with an organosilane and thereafter incorporating the combination into a water dispersible polyester resin. The water dispersible polyester resin acts as a carrier for the polyolefin-organosilane material. The polyester is miscible and solvates with the polyolefin-organosilane material, and as the polyester is dispersed into the water, it carries along with it the polyolefin material that is desired to be dispersed in the water. The polyester material performs another function in that it separates the silane portions of adjacent molecules to greatly retard cross-linking of the silane materials in the aqueous media. The polyester material is compatible with both the polyolefin portion and the organosilane portion as is necessary to perform both of the above functions. It appears that the long chain fatty acid portion of the polyester molecule is compatible with and solvates the polyolefin desired to be dispersed, while carboxyl groups of the polyester resin have affinity for the silane material particularly when hydrolyzed. Polyester materials are made dispersible by incorporating surface active agents therewith, and the polyester in turn carries the polyolefin-organosilane material along with it as the polyester is emulsified. The organosilane in addition to aiding in the process of dispersing the polyolefin, performs the additional function of providing an attachment to the surface of the glass fibers.

It is not necessary for the polyester material to be chemically combined with the polyolefin-organosilane material while the materials are in the water dispersed phase. When the polyester material is not so combined, the organosilane has greater mobility and can better coat the surface of the glass fibers in a preferred somewhat laminated orientation. Polyester materials when in a chemically uncombined state, surround the polyolefin backbone molecules which project outwardly from the organosilane material. With this arrangement, later applied impregnating polyolefin-molding resins can chemically combine directly with the polyolefin backbone material that is attached to the silane. In those instances where polyester material is not chemically combined with the polyolefin-organosilane material, it may be displaced to some degree by the laminating resin during the molding process. Where this displacement of the polyester is desired, the polyester material is preferably a non-cross-linking saturated polyester. In most instances, however, an increase in strength is obtained by using an unsaturated polyester material which can chemically combine with the polyolefin-laminating resin, and/or backbone material either after the backbone material is dried onto the fibers, or during the molding operation. The inclusion of an unsaturated monomer will usually be helpful for attaching the polyolefin-organosilane material with the polyester material. While inert solvents can be used, unsaturated monomeric solvents will be preferred since they are capable of entering into the hardening reaction which occurs at or subsequent to molding.

DESCRIPTION OF THE PREFERRED EMBODIMENTS

A polyolefin is made water dispersible by means of the following procedure:

EXAMPLE 1

Two hundred and forty grams of a polypropylene resin having a molecular weight of approximately 2,000 and containing some unsaturated bonds was mixed with 2,400 cc. of xylene at room temperature. The mixture was heated with continual stirring to a temperature of 300° F. to completely dissolve the polypropylene material. In a separate vessel, 14 grams of benzoyl peroxide were mixed with 1,000 cc. of a 15 percent by weight solution of gamma-aminopropyltriethoxysilane in xylene solvent. The silane and peroxide are mixed at room temperature and are thereafter slowly added to the polypropylene solution with continual stirring while at 300° F. The materials are cooked for approximately 1 hour at 300° F. following which the materials are poured into cooling pans to a depth of approximately 1 inch. The pans are cooled to room temperature and dried for 24 hours at 70° F. to reduce the solvent to a level of approximately 15 percent by weight. The material is then ground in a hammermill until all of the material passes through an 18 mesh screen.

A polyester resin is made using the usual procedures well known in the art by cooking 1 mole of phthalic anhydride, 1 mole of maleic anhydride, and 2.04 moles of propylene glycol to a molecular weight of approximately 1,200. This polyester resin is then thinned to a syrupy material by mixing 70 parts of the resin with 30 parts of styrene. Ninety parts of the polyester resin syrup is mixed with 10 parts of the polypropylene-organosilane powder prepared as above described, and this mixture is thoroughly blended for 1 hour to produce what is hereinafter called dispersible resin blend.

An aqueous dispersion of the dispersible resin blend of the following composition is prepared:

| Materials | Percent by Weight |
| --- | --- |
| Dispersible resin blend | 20.0% |
| Emulphor EL—719 nonionic emulsifier (polyoxyethylated vegetable oil) | 0.25% |
| Triton X—100 nonionic emulsifier (Isooctyl phenylpolyethoxy ethanol) | 0.25% |
| Igepal CO—210 nonionic emulsifier (Nonylphenoxypoly (ethyleneoxy) ethanol) | 0.25% |
| Water (deionized) | Balance |

The water dispersion is prepared by adding the emulsifying agents to the dispersible resin blend and thoroughly mixing for 10 minutes. Approximately one-fourth of the water is thereafter added to the mixer in small amounts until the inversion point is reached. After the inversion point is reached, it is mixed slowly for approximately 5 minutes, following which this mixture is added to one-half of the water contained in a mix tank. After the materials are thoroughly mixed in the mix tank, the remainder of the water is added to complete the preparation of the resin emulsion. This 20 percent solids emulsion is applied to glass fibers at forming using a standard graphite roll type applicator over which the fibers are drawn. After being wetted by the emulsion, the fibers are drawn together into a 408 monofilament strand which is then wound into a package and dried. The fibers so produced have a coating thereon which comprises approximately 3.65 percent by weight of the coated strand. The coated strands are chopped into approximately one-quarter inch lengths. Twenty parts of these coated short fibers are then placed in a drum tumbler with 80 parts of an isotactic polypropylene having a melting index of 5.5 and a molecular weight of approximately 200,000. This mixture is then placed in a 1 inch National Rubber Machine Screw Extruder which is electrically heated to 500° F. and the mixture is extruded into a one-quarter inch diameter cylindrical rod which is then fed into a Cumberland Pelletizer to form ¼-inch long pellets. The pellets are in turn fed to an injection molding machine heated to 500° F. and the material is extruded into a standard ASTM D-638 dog bone test specimen, which when cooled at room temperature and tested in a standard tensile testing machine, broke when a force equal to 6,970 square pounds per inch was applied to the specimen. The material also has a modulus of 471,000 pounds. These results are tabulated as tests 1-A in the following table. The process was repeated using different blends of the coated glass fibers and of the isotacticpolypropylene resin and their strengths are recorded as tests 1-B through 1-F in the following table:

TABLE 1

| | Strand Solids | Percent Glass | Tensile Strength p.s.i. | Modulus |
|---|---|---|---|---|
| 1-A | 3.82 | 20.1 | 6,970 | 471M |
| 1-B | 3.82 | 20.3 | 8,080 | 531M |
| 1-C | 3.82 | 20.1 | 9,020 | 697M |
| 1-D | 3.82 | 27.8 | 10,470 | 867M |
| 1-E | 3.82 | 38.0 | 11,300 | 1060M |
| 1-F | 3.82 | 18.2 | 9,555 | 829M |
| 1-G | 2.06 | 20.7 | 5,990 | 835M |
| 2-H | 2.92 | 18.0 | 7,880 | 518M |
| 2-I | 2.92 | 20.1 | 8,220 | 537M |
| 2-J | 2.92 | 22.2 | 8,800 | 524M |
| 2-K | 3.52 | 21.0 | 9,070 | 671M |

By way of comparison, the process given above was repeated using a coated glass the coating of which did not contain the polypropylene-organosilane material. In its place, the glass was coated with an aqueous solution containing 0.4 percent of glycidoxypropyltriethoxysilane, 12.0 percent of the same polyester material given above, and the same percentages of the surfactants used above. Dog bone samples were made using this coated glass to give specimens having 20.7 percent glass and a tensile strength of 5,990 p.s.i. Properties of the material described in this paragraph are given as 1-G in the above table.

EXAMPLE 2

The process of Example 1 was repeated excepting that one percent by weight of a material made by reacting 13.7 parts of gammaaminopropyltriethoxysilane and 16.9 parts of polyethylenimine (Montrek 12), and 0.25 percent of glacial acetic acid are added to the emulsion that was used to coat the fibers. The coated fibers had a coating of 2.92 percent by weight of the coated fiber, and a dog bone sample having 18 percent of glass fibers therein, had a tensile strength of 7,880 p.s.i. This material is listed as 2-H in Table 1 above.

The process of Example 2 was repeated to make a sample comprising 20.1 percent by weight of glass, and its result is given as test 2-I of Table 1.

The process was also repeated preparing a sample having 22.2 percent of glass by weight, and its result is given as test 2-J in Table 1 above.

The process of Example 2 was further repeated excepting that the coated glass fibers of Example 2 were given a second coating of the resin emulsion before they were chopped into one-quarter inch lengths. The glass fibers had a resin coating comprising 3.52 percent by weight of the coated strand, and dog bone samples containing 21.0 percent by weight of this double-coated strand had a tensile strength of 9,070 p.s.i. The results of this material are given as test 2-K in Table 1 above.

In the above reaction between the gamma amino propyltriethoxy silane and the polyethylenimine, the imine ring is opened by the amino group of the organo silane. The imine group is a very reactive group, and will react will substantially any type of organo functional group, as for example: an unsaturate group, an acid group, an acyl chloride group, an amine group, a hydroxyl group, a thio group, a halide group, etc., as described in the publication entitled "Ethylenimine," published by Dow Corning Chemical Company, copyright 1965 or subsequent edition.

The polyethylenimine-organosilane product, when acidified, contains substituted ammonium groups which make the material soluble. This material is a solubilizing aid, and the materials of Example 2 indicate that other dispersible resinous materials can be added to the polyolefin-organosilane materials in addition to the polyester material to help disperse the material without harmfully affecting the resulting properties of the finished molded material.

EXAMPLE 3

The procedure given for test 1-A above was repeated excepting that "Reactor Flake" polyethylene having a molecular weight of approximately 200,000 was used as the molding resin in place of the isotactic polypropylene. Test specimens prepared using this molding resin according to the procedure for test 1-A above had a tensile strength of 6,900 p.s.i.

By way of comparison, test specimens using the same polyethylene molding resin when substituted in the test procedure given for test 1-G above had a tensile strength of 5,900 p.s.i.

EXAMPLE 4

Any polyolefin which contains some reactive groups for coupling with the organosilane can be dispersed in water using the techniques of the present invention.

The process of test 1-A was repeated excepting that (Microthene) polyethylene having a molecular weight of approximately 10,000 was substituted for the unsaturated polypropylene material that was coupled with the organosilane for solubilizing. In addition, tertiary butyl peroxide was substituted for the benzol peroxide in the production of the polyolefin-organosilane material. Test samples made in accordance with the procedure of test 1-A had a strength comparable to that of the material of test 1-A. This test clearly indicates that any polyolefin material can be dispersed in water using the techniques of the present invention to give good coupling between a polyolefin impregnating resin and glass fibers.

EXAMPLE 5

Any organosilane having functional groups thereon which can be coupled to the polyolefin material to be dispersed can be used to practice the techniques of the present invention. In addition to an amine group, the organosilane can have an unsaturated group, as for example a vinyl or an acrylic group or an imine group. It can also have a silane hydrogen group, or any other group that can be linked to the polyolefin. Suitable examples, although not limited thereto, are given in Table 1 of the above identified related application Ser. No. 589,791. By way of example, the process of 1-A is repeated using gammamethacryloxypropyltrimethoxysilane for the gammaaminopropyltriethoxysilane of Example 1. The material thus prepared is equally as water dispersible as that of test 1-A, and test specimens prepared therefrom have comparable strengths.

EXAMPLE 6

The procedure of test 1-A is repeated excepting that gammaglycidoxypropyltrimethoxysilane containing amine curing agent is substituted for the gammaaminopropyltriethoxysilane of test 1-A. The polymer so prepared is equally as water dispersible as the material of test 1-A, and test specimens prepared using the glass fibers coated with this material in accordance with the procedure of test 1-A have comparable tensile strength.

The polyolefin-organosilane combination product may comprise up to approximately 50 percent, and preferably at least 10 percent of organosilane, and from approximately 50 percent to approximately 90 percent of the polyolefin. The aqueous dispersible resin will comprise from approximately 5 percent to approximately 30 percent of the combination product and from approximately 70 percent to approximately 95 percent of the polyester. The aqueous dispersion may comprise the following approximate percentages:

| | |
|---|---|
| Dispersible resin | 5% to 30% |
| Surface active agents | 0.5% to 3% |
| Other water soluble resin | up to 5% |
| Water | balance |

The organosilane can react with the polyolefin in one of two ways. In one type of reaction, a functional group on the organo portion of the silane reacts with a remaining double bond of the polyolefin; and in another type of reaction, silane hydrogen reacts with the double bond of the polyolefin. In the first type of reaction, the organosilane will have a formula $R_n$-$Sil_{(4-n)}$ wherein $R_n$ is an organo group that is reactive with an unsaturate and L is selected from the group of hydrogen, and an alkoxy radical having from one to four carbon atoms. As representative of some unsaturated silanes which can be used, the following are given: vinyl silane, vinyltriethoxysilane, vinyldichlorosilane, vinyltrichlorosilane, divinyldichlorosilane, allyl silane, allyldichlorosilane, allyltrichlorosilane, diallydichlorosilane, allydifluorosilane, vinyldibromosilane, methoxyvinyldichlorosilane, dodecenylvinyldichlorosilane, didecenyldichlorosilane, didodecenyldifluorosilane, cyclohexenyltrichlorosilane, hexenylhexoxysilane, vinyl-tri-n-butoxysilane, hexenyltri-n-butoxysilane, allyldipentoxysilane, butenyldodecoxysilane, decenyldidecoxysilane, dodecenyldioctoxyfluorosilane, heptenyltriheptoxysilane, allyltripropoxysilane, vinyl-n-butoxydiiodosilane, divinylsilane, diallyldi-n-butoxysilane, pentenyltripropoxysilane, allyldi-n-butoxysilane, vinylethoxysilane, sec.-butenyltriethoxysilane 5-benzyl-6-(dinonoxysily)-1-hexene, 4-phenyl-5-propoxydichlorosilyl)-1-pentene, 2-cyclopentyl-3-silyl-1-propene, 4-cyclohexyl-7(tertiarybutoxydifluorosily)-2-dodecene, o-(trimethoysilyl) styrene, o-diphenoxysilyl)-p-octylstyrene, o-(benzyloxydichlorosilyl)-o'-methylstyrene, 3-(tolyloxysilyl) vinylcyclohexane, 3-(tolyloxydibromosilyl)-2-phenyl-1-butene, 3-(tripropoxysilyl)-5-methylvinylcyclohexane, 5-cyclohexyl-6-(triethoxysilyl)-1-hexene, (methylcyclopentenyl) dichlorosilane.

The reaction of the organo functional groups with the polyolefins is usually catalyzed by a free radical catalyst as for example an organic peroxide or a hydroperoxide such as the following: benzoyl peroxide, tertbutyl hydroperoxide, 1-hydroperoxy-1phenylcyclohexane, di (tertiary butyl) peroxide, methyltetrahydrofuran peroxides, aldehyde and ketone peroxides, acetyl peroxide, stearyl peroxide, toluyl peroxide, anisyl peroxide, cumene hydroperoxide methyl cyclohexyl hydroperoxide, cyclohexyl hydroperoxide, perbenzoic acid, 1-hydroxycyclohexyl hydroperoxide, hydroxy heptyl peroxide, isopropyl (dimethyl) hydroperoxymethane, 1-methyl-1-hydroperoxycyclopentane, tetralin hydroperoxide, octahydrophenanthrene hydroperoxide, dimethyl (isopropylphenyl) hydroperoxymethane, methylethyl (ethoxyphenyl) hydroperoxymethane, methyldecyl (methylphenyl) hydroperoxymethane, dimethyldecylhydroperoxymethane, methylchlorophenylphenylhydroperoxymethane, and dimethyl (tertiarybutylphenyl) hydroperoxymethane.

As previously stated, silane hydrogen can also react with the remaining unsaturate groups of a polyolefin using either a free radical catalyst, as for example one of those given or a hydrogenation catalyst such as platinum, activated carbon or hexochloroplatinic acid or some other chloroplatinic acid, etc. Suitable examples of compounds having SiH groups are: silanes such as monosilane, disilane, trisilane, or mixtures thereof, monochlorosilane, dichlorosilane, trichlorosilane, and organo substituted silanes thereof, such as methychlorosilane, methyldichlorosilane, dimethylchlorosilane, and higher silanes containing other aliphatic, cycloaliphatic and/or organic radicals and/or other halogens; hydroxy-organosilanes such as tris-isoamyl-hydroxysilane or diethoxysilane, siloxanes, and organically substituted siloxanes, and the oligomers and polymers thereof, as for example presilaxone $(SiH_2O)_n$, methyl-hydrogenpolysiloxane $(SiHCH_3O)_n$, and other monomer, molecular, and macromolecular silicon compounds provided that they contain at least one SiH group. A preferred class of organosilanes are those in which the organo portion contains nitrogen such as gamma-aminopropylsilane, gamma-aminopropyldiethoxysilane, gamma-aminopropyldimethoxysilane, bis (beta-hydroxyethyl) gamma-aminopropylethoxysilane, bis (beta-hydroxyethyl) gamma-aminopropyldiethoxysilane, m-aminophenyl-di-ptychsiloxazolidine, N (B amino-ethyl) gamma-aminopropylethoxy silane or a diethoxy-silane, N-phenyl-gamma-aminopropylmethoxysilane or the dimethoxysilane, etc. Organo silanes containing nitrogen increased the affinity for the surface of the glass fibers, and for this reason are preferred.

It will be apparent that there has been provided a new and improved method of dispersing polyolefins in water as well as new and improved resin coated glass fibers having improved coupling action with polyolefin molding resin.

While the invention has been described in considerable detail, I do not wish to be limited to the particular embodiments described, and it is my intention to cover hereby all novel adaptations, modifications, and arrangements thereof which come within the practice of those skilled in the art to which the invention relates.

I claim:

1. The method of producing polyolefin compatible glass fibers comprising: forming particles of the reaction product of an organosilane having functional groups reactive with carbon to carbon double bonds and a polyolefin, coating said particles with a polyester resin, dispersing the polyester resin coated particles in water using a surface active agent, applying the water dispersion of polyester resin coated particles to glass fibers, and drying the dispersion on the fibers.

2. The method of claim 2 including the step of: dispersing the soluble reaction product of polyethylenimine and an organosilane in the water used to disperse said polyester resin coated particles.

3. The method of securing a polyolefin to glass fibers comprising: forming particles of the reaction product of an organosilane having functional groups reactive with carbon to carbon double bonds and a polyolefin, coating said particles with a polyester resin, dispersing the polyester resin coated particles in water using a surface active agent, applying the water dispersion of polyester resin coated particles to glass fibers, drying the dispersion on the fibers, mixing the dried fibers with a polyolefin impregnating resin, and applying sufficient heat and pressure to the mixture to fuse the impregnating resin to the reaction product and the reaction product in turn to said fibers.

4. Glass fibers having a coating thereon comprising: particles of the combination product of an organosilane having functional groups reactive with carbon to carbon double bonds and a polyolefin, said particles having a coating of a fusable polyester resin material thereon, and said fusable polyester resin coated particles having an aqueous dispersing agent on the surface of the polyester resin coating.

5. The coated glass fibers of claim 4 wherein said combination product particles comprise approximately four parts of polyolefin and approximately one part organosilane, and said coating comprises approximately 45 parts of the polyester resin.

6. The coated glass fibers of claim 4 wherein said fusable polyester material comprises a crosslinkable polyester resin and an unsaturated cross-linking monomer.

7. The glass fibers of claim 4 wherein said polyolefin is polypropylene, and said organosilane is gamma-aminopropyl-triethoxysilane.

8. The coated glass fibers of claim 4 wherein said aqueous dispersing agent includes a reaction product of polyethylenimine and an organosilane.

9. The coated glass fibers of claim 8 wherein said aqueous dispersing agent includes a nonionic emulsifying agent.

* * * * *